Dec. 29, 1936.  W. T. THACKER  2,066,240
ROCKER STUD BEARING
Filed Aug. 28, 1935
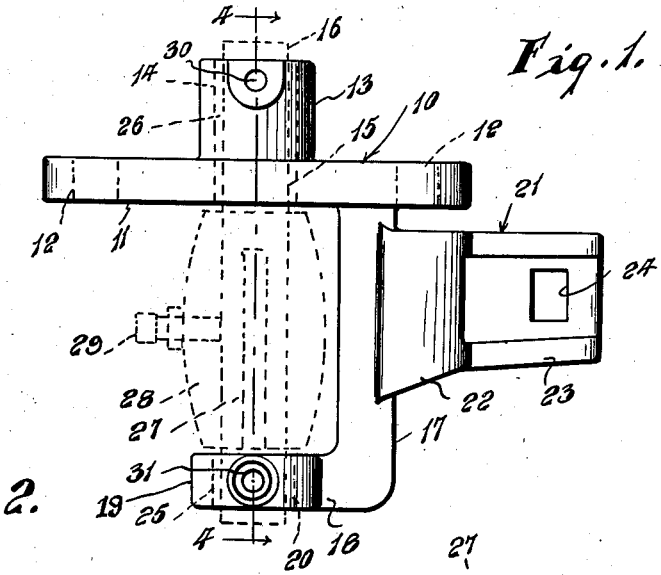
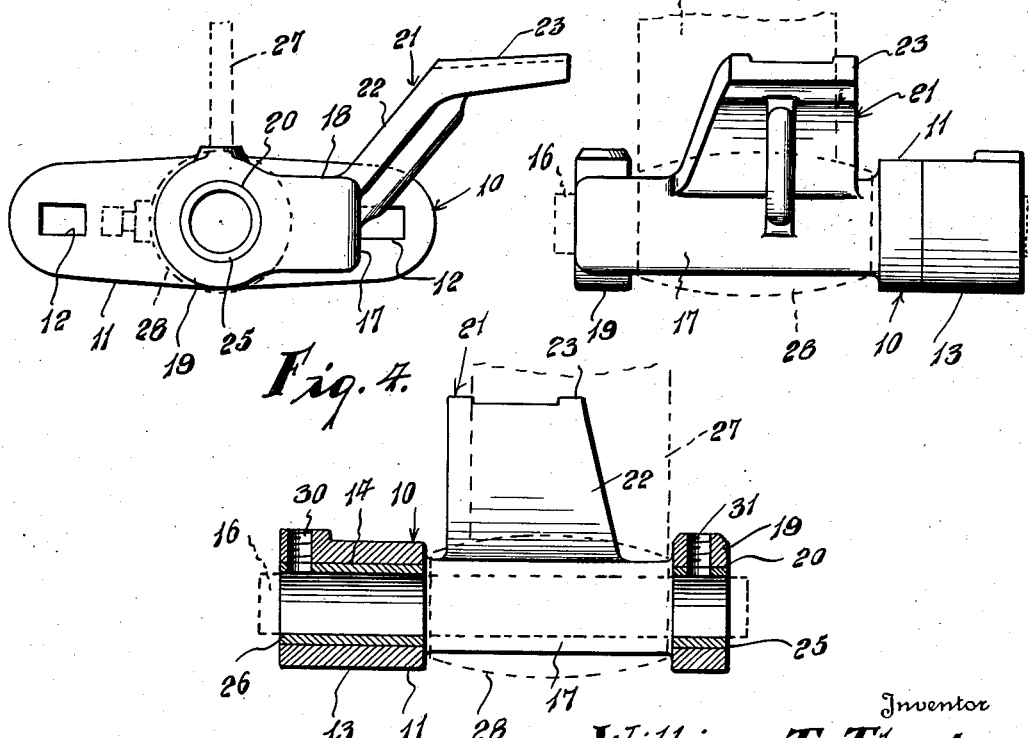
Inventor
William T. Thacker
By L. F. Randolph Jr.
Attorney Patented Dec. 29, 1936

2,066,240

UNITED STATES PATENT OFFICE 2,066,240

ROCKER STUD BEARING

William T. Thacker, Greenville, S. C.

Application August 28, 1935, Serial No. 38,296

1 Claim. (Cl. 308—21)

The invention relates primarily to the provision of an improved construction of rocker stud bearing for the lay sword of looms, and has for its object the provision of a bearing member that may be readily applied to and removed from a loom frame, and that is provided with means for adequately bracing the bearing so as to prevent undesirable movement of the lay sword while in operation, and that is also furthermore designed to reduce the shafting required for carrying the lay sword.

The invention will be described in detail hereinafter and will be found illustrated in the accompanying drawing, in which Figure 1 is a top plan view of the improved rocker stud bearing showing the parts supported in the bearing in broken lines, Figure 2 is a side view in elevation of the parts shown in Figure 1, Figure 3 is a front end view, and Figure 4 a transverse sectional view on the plane indicated by the line 4—4 of Figure 1.

Referring to the drawing in which similar reference characters are used to designate corresponding parts throughout the several views, the improved rocker stud bearing comprises a body generally designated 10 and including a plate 11 provided with openings 12 for the reception of bolts or the like for securing the body member 10 to the frame member of a loom.

Projecting laterally of one side of the plate 10 is a tubular nipple 13, the bore 14 thereof being in alinement with an opening 15 in the plate 11, said bore 14 and opening 15 providing a bearing member for a shaft 16.

Extending from the opposite side of the plate 11 from the nipple 13 is an arm 17 having its extremity turned at a right angle thereto as shown at 18 and in substantial parallelism with the plate 11, the extremity of said arm being also enlarged as shown at 19 and provided with a bearing opening 20 alined with the opening 15 and the bore 14 of the nipple 13, and supporting the opposite end of the shaft 16, hereinbefore referred to.

Extending laterally from the arm 17 is a leg member 21, said leg member having the portion adjacent to the arm 17 inclined upwardly and outwardly from the arm 17 as shown at 22, and its extremity extended substantially horizontally as shown at 23 and provided with an opening 24 to receive a bolt or other driven member to secure the extremity of the leg member to a skirt-board or the like on the loom frame.

Included in the drawing are also shown bushings 25 and 26, and obviously the employment of bushings would be an advantage, but I do not limit myself to the use of the bushings but may mount the shaft 16 directly in the bearing openings 14, 15, and 20.

The shaft 16 is adapted to have secured thereto a lay sword member 27, provided with an enlarged tubular end connection 28 to receive the shaft 16, and 29 designates a set screw for securing the lay sword and the tubular member for rotation with the shaft 16.

The usual lubricating openings are provided for the shaft 16, as designated 30 and 31, and preferably have pressure lubricating members of which there are a number of types on the market secured therein.

While I have shown and described the invention for use in connection with mounting a lay sword of a loom, the bearing may obviously be used for other purposes where a rocker shaft is called for, and I do not, therefore, limit myself to the specific application as herein described.

What is claimed is:—

A rocker stud bearing for loom swords, comprising a plate adapted for attachment to a loom frame, a central bearing nipple extending integrally from one side of said plate, an arm extending integrally and laterally from the opposite side of said plate in offset relation to the nipple, the free end of said arm extended at an angle thereto and in substantial parallelism with the plate, said free end enlarged and having a bearing opening therein, a shaft journaled in said bearing opening and nipple, and a leg member extending integrally from said arm between said plate and free end upwardly and forwardly in the opposite direction to the free end of the arm and having a substantially horizontal portion adapted to be secured to a skirt-board of the loom frame.

WILLIAM T. THACKER.